US011750704B2

(12) United States Patent
Gopinath et al.

(10) Patent No.: US 11,750,704 B2
(45) Date of Patent: *Sep. 5, 2023

(54) SYSTEMS AND METHODS TO RETAIN EXISTING CONNECTIONS SO THAT THERE IS NO CONNECTION LOSS WHEN NODES ARE ADDED TO A CLUSTER FOR CAPACITY OR WHEN A NODE IS TAKEN OUT FROM THE CLUSTER FOR MAINTENANCE

(71) Applicant: Citrix Systems, Inc., Fort Lauderdale, FL (US)

(72) Inventors: Sandhya Gopinath, Bangalore (IN); Sathaiah Dontula, Bangalore (IN); Ranjith Nath, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,719

(22) Filed: Aug. 5, 2021

(65) Prior Publication Data
US 2021/0368009 A1 Nov. 25, 2021

Related U.S. Application Data

(63) Continuation of application No. 15/670,749, filed on Aug. 7, 2017, now Pat. No. 11,089,113.

(51) Int. Cl.
*H04L 67/142* (2022.01)
*H04L 41/0806* (2022.01)
(Continued)

(52) U.S. Cl.
CPC ........ *H04L 67/142* (2013.01); *H04L 41/0806* (2013.01); *H04L 67/1046* (2013.01);
(Continued)

(58) Field of Classification Search
None
See application file for complete search history.

(56) References Cited

U.S. PATENT DOCUMENTS

| 8,533,285 | B2 * | 9/2013 | Natham | H04L 41/50 709/227 |
| 8,804,740 | B2 * | 8/2014 | Rangaraman | H04L 45/38 370/396 |

(Continued)

OTHER PUBLICATIONS

Non-Final Office Action on U.S. Appl. No. 15/670,749 dated Apr. 2, 2019.

(Continued)

*Primary Examiner* — Ranodhi Serrao

(57) ABSTRACT

Described embodiments provide systems and methods for pushing session information to a newly joined node in a cluster of nodes. In the cluster, each node may maintain a session table of existing sessions. One or more nodes may detect a new node has joined the cluster. Each node, responsive to the detection, may apply a hash function on a tuple of each session of the existing sessions in the session table of the node to determine whether one or more existing sessions are identified to be owned by the new node as a result of the hash function. Each node, responsive to identifying that one or more sessions are to be owned by the new node, may push corresponding session information to the new node. The new node may become configured to receive a packet corresponding to the one or more sessions and to process the packet.

18 Claims, 10 Drawing Sheets

(51) Int. Cl.
*H04L 67/104* (2022.01)
*H04L 67/1008* (2022.01)
*H04L 67/1023* (2022.01)
*H04L 69/40* (2022.01)
*H04L 67/10* (2022.01)
*H04L 45/7453* (2022.01)
*H04L 43/028* (2022.01)

(52) U.S. Cl.
CPC ........ *H04L 43/028* (2013.01); *H04L 45/7453* (2013.01); *H04L 67/10* (2013.01); *H04L 67/1008* (2013.01); *H04L 67/1023* (2013.01); *H04L 69/40* (2013.01)

(56) References Cited

U.S. PATENT DOCUMENTS

| | | | | |
|---|---|---|---|---|
| 8,891,364 | B2* | 11/2014 | Gopinath | H04L 45/24 711/216 |
| 8,971,323 | B2 | 3/2015 | Mithyantha et al. | |
| 8,990,431 | B2* | 3/2015 | Goel | H04L 47/33 709/228 |
| 9,225,806 | B2 | 12/2015 | Rangaraman et al. | |
| 9,497,281 | B2* | 11/2016 | Jagadish | H04L 45/7453 |
| 9,519,518 | B2 | 12/2016 | Kamath et al. | |
| 9,577,892 | B2 | 2/2017 | Chaudhary et al. | |
| 9,596,305 | B2 | 3/2017 | Chauhan et al. | |
| 9,661,094 | B2* | 5/2017 | Goel | H04L 67/56 |
| 9,769,205 | B2 | 9/2017 | Gopinath et al. | |
| 9,888,068 | B2* | 2/2018 | Kamath | H04L 63/166 |
| 2010/0287227 | A1* | 11/2010 | Goel | H04L 67/56 709/202 |
| 2013/0336317 | A1* | 12/2013 | Mithyantha | H04L 45/18 370/390 |
| 2013/0336320 | A1* | 12/2013 | Rangaraman | H04L 45/38 370/392 |
| 2013/0336329 | A1* | 12/2013 | Gopinath | H04L 45/24 370/401 |
| 2013/0339516 | A1* | 12/2013 | Chauhan | H04W 4/18 709/224 |
| 2013/0339547 | A1* | 12/2013 | Nath | H04L 61/5076 709/245 |
| 2013/0339549 | A1* | 12/2013 | Rangaraman | H04L 69/326 709/245 |
| 2014/0301388 | A1* | 10/2014 | Jagadish | H04L 67/563 370/389 |
| 2014/0304352 | A1* | 10/2014 | Chaudhary | H04L 67/1029 709/208 |
| 2014/0304361 | A1 | 10/2014 | Chauhan et al. | |
| 2014/0304399 | A1* | 10/2014 | Chaudhary | G06F 11/3093 709/224 |
| 2014/0304409 | A1* | 10/2014 | Kamath | H04L 67/1036 709/225 |
| 2014/0304499 | A1* | 10/2014 | Gopinath | H04L 63/168 713/151 |
| 2014/0344326 | A1* | 11/2014 | Kamath | G06F 9/5027 709/203 |
| 2017/0070425 | A1 | 3/2017 | Mithyantha | |

OTHER PUBLICATIONS

Non-Final Office Action on U.S. Appl. No. 15/670,749 dated Apr. 8, 2020.

Non-Final Office Action on U.S. Appl. No. 15/670,749 dated Oct. 3, 2019.

Notice of Allowance on U.S. Appl. No. 15/670,749 dated Apr. 7, 2021.

* cited by examiner

SYSTEMS AND METHODS TO RETAIN EXISTING CONNECTIONS SO THAT THERE IS NO CONNECTION LOSS WHEN NODES ARE ADDED TO A CLUSTER FOR CAPACITY OR WHEN A NODE IS TAKEN OUT FROM THE CLUSTER FOR MAINTENANCE

CROSS-REFERENCE TO RELATED APPLICATION

This patent application is a continuation of, and claims priority to and the benefit of U.S. patent application Ser. No. 15/670,749, titled "SYSTEMS AND METHODS TO RETAIN EXISTING CONNECTIONS SO THAT THERE IS NO CONNECTION LOSS WHEN NODES ARE ADDED TO A CLUSTER FOR CAPACITY OR WHEN A NODE IS TAKEN OUT FROM THE CLUSTER FOR MAINTENANCE," and filed Aug. 7, 2017, the contents of all of which are hereby incorporated herein by reference in its entirety for all purposes.

BACKGROUND

In computer cluster systems, an external device (e.g., a switch or router) may send incoming packets to nodes in the cluster, to distribute incoming traffic. Once received, a recipient node may internally steer the packet across the cluster of nodes using a common mechanism to identify the node handling a session for the packet. Session connectivity issues may arise with the joining of new nodes into the cluster or setting of existing nodes to passive mode.

SUMMARY

This summary is provided to introduce a selection of concepts in a simplified form that are further described below in the Detailed Description section. This summary is not intended to identify key features or essential features, nor is it intended to limit the scope of the claims included herewith.

The present disclosure is directed towards systems and methods of retaining existing connections in clusters of nodes. In a cluster system, incoming packets may be distributed across nodes using various routing techniques, such as multi-path routing (e.g., equal-cost-multipath-routing (ECMP)), path addressing (e.g., dynamic source routing (DSR)), and channel bonding (e.g., link aggregation), among others. Each node of the cluster system may keep track of new nodes joining the cluster and nodes leaving the cluster based on heartbeat packets. The nodes of the cluster system may establish a set of active nodes (sometimes referred to as an "operational view") that may serve network traffic. When a packet arrives on a node, the recipient node ("flow receiver") may find the proper node ("flow processor") to process the packet by computing a hash value, using a combination of a two-tuple including a source address and destination address or a four tuple including a source address, source port, destination address, and destination port. The hash value may correspond a session owned by at least one of the nodes in the cluster.

Using the calculated hash value at one node, the packet may be processed at the recipient node or sent to another node. If the hash value corresponds to the recipient node, the recipient node may proceed to processing the packet. On the other hand, if the hash value does not correspond to the recipient node, the recipient node may identify the proper node to forward the packet in accordance to a preference list of nodes. Each packet or session of the packet may be bound to a particular node ("spotted entity"), a subset of active nodes ("partially spotted entity"), or any active node in the cluster system ("striped entity"). The preference list of nodes may include the set of active nodes that may own the packet or session enumerated in accordance to the hash value. The original recipient node may forward the packet to one of the nodes from the preference list. Distributing the packet in this manner may ensure that traffic is uniformly distributed across the nodes of the cluster system.

Issues with maintaining sessions may arise with the joining of new nodes to the cluster and/or with the leaving of existing nodes from the cluster. When a node fails or otherwise leaves the cluster, a proportional subset of hash values (1/N) for the preference list referencing the leaving node alone may be impacted. When a new node enters or otherwise joins the cluster, the new node may only correspond to a proportional subset of hash values (1/N) for the preference list. In either event, the upstream distribution of traffic may change due to addition or subtraction of new routes or interfaces within the cluster system. Even if the hash values for the sessions were recalculated, the sessions corresponding to the proportional subset of hash values (1/N) for the preference list may be lost. When a node leaves the cluster, the node's share of sessions (1/N of hash values in the preference list) may be lost. When a new node joins the cluster, the node's share of sessions (1/N of hash values in the preference list) may be taken from the existing nodes in the cluster.

Additionally, when new nodes are added to the cluster, packets belonging to sessions to existing nodes may be steered to and arrive at the new node, instead of the existing nodes that own the corresponding sessions. As the new node does not have any session information regarding the existing sessions on the other nodes of the cluster, the newly added node may reset the sessions, resulting in the loss of existing sessions.

To retain sessions across the nodes when a new node joins the cluster, each of the existing nodes in the cluster may detect the newly joining node. Having detected the new node, each existing node may learn about the new node and may include the new node in the operational view. To determine whether any session is to be owned by the new node, each existing node may iterate through the sessions arranged in a session table. For each session maintained in the session table, each existing node may calculate a hash value of a tuple of the session with the source address, source port, destination address, and destination port. Having calculated the hash value for each session, each existing node may identify a subset of hash values corresponding to the newly joined node and may identify a subset of existing sessions mapping to the hash value. The identified subset of existing sessions may be assigned to the newly joined node. Each existing node may then push the session information to the newly joined node. During the push process, if any nodes enter or leave the cluster, the hash values for each session may be recalculated and the updated session information may again be pushed to the new node. Once the push of the session is complete, each existing node may notify the newly joined node. With the session information updated, any packet of one of the sessions assigned to the new node may be directed by the recipient node to the new node.

Subsequently, if the newly joined node receives a packet and does not have session information for the session for the packet, the newly joined node may initiate a hunt operation. The newly joined node may create session information using a tuple of the received packet with a source address, source port, destination address, and destination port. The session information may initially identify a target node as invalid. The newly joined node may also queue the packet and any additional packets for the same session. The newly joined node may identify a next node in the preference list of nodes and may then send a hunt message with the session information to the identified node. Once the hunt message arrives, the recipient node may determine whether the session for the packet exists on the node. If the session for the packet exists on the node, the recipient node may send back a reply to the newly joined node indicating that the session exists on the node. The newly joined node may then update the session in the session table identifying the next node as the target node for the session to steer packets in the session to the target node. In contrast, if the session for the packet does not exist on the node, the recipient node may send back a reply to the newly joined node indicating that the session does not exist on the node. The hunt message may then be forwarded to the next node enumerated in the preference list, and may repeat the process. If there are no more nodes in the preference list, the newly joined node may determine that the target node is invalid and may reset the connection by freeing up the session and dropping the queued packets.

On the other hand, when a node leaves from the cluster (e.g., by being set to passive for maintenance), the node may be immediately removed from the set of active nodes in the preference list, thereby affecting routing or interfaces through the cluster system. As a result, the packets of the session handled previously by the node to be removed may arrive at other nodes. The other nodes may also not steer traffic to the node to be removed. As these other nodes do not have session information regarding the packets of the session, the other nodes may reset the session, also resulting in the loss of existing sessions.

To preserve sessions across the other nodes remaining in the cluster, a timeout may be set for to delay the removal of the node from the set of active nodes. During the timeout period, traffic may be steered by the other nodes away from the node to be removed. After the timeout period, the node may be removed from the cluster. The node to be removed may create session information using a tuple of the received packet with a source address, source port, destination address, and destination port. The session information may initially identify a target node as invalid. The node to be removed may also queue the packet and any additional packets for the same session. The node to be removed may identify a next node in the preference list of nodes and may then send a hunt message with the session information to the identified node. Once the hunt message arrives, the recipient node may determine whether the session for the packet exists on the node. If the session for the packet exists on the node, the recipient node may send back a reply to the node to be removed indicating that the session exists on the node. The node to be removed may then update the session in the session table identifying the next node as the target node for the session to steer packets in the session to the target node. In contrast, if the session for the packet does not exist on the node, the node to be removed may determine that the target node is invalid and may reset the connection by freeing up the session and dropping the queued packets.

In one aspect, this disclosure is directed to a system for pushing session information to a newly joined node in a cluster of nodes. A cluster of nodes may be intermediary to a plurality of clients and a plurality of servers. Each node of the cluster of nodes may maintain a session table of a plurality of existing sessions between the plurality of clients and the plurality of servers. One or more nodes in the cluster of nodes may detect a new node has joined the cluster of nodes. Each node in the cluster of nodes, responsive to the detection, may apply a hash function on a tuple of each session of the plurality of existing sessions in the session table of that node to determine whether one or more existing sessions of the plurality of existing sessions are identified to be owned by the new node as a result of the hash function. Each node in the cluster of nodes, responsive to identifying that one or more sessions are to be owned by the new node, may push session information corresponding to the one or more sessions to the new node. The new node may become configured to receive a packet corresponding to the one or more sessions and to process the packet.

In some embodiments, the tuple may include a 4-tuple of a source internet protocol address, source port, destination internet protocol address and a destination port of one or more packets of the session. In some embodiments, the one or more nodes in the cluster of nodes may detect the new node based on one or more heartbeat packets communicated by the new node.

In some embodiments, the one or more nodes in the cluster of nodes may establish an operational view of the cluster of nodes. The operational view may include a set of active nodes that process network traffic between the plurality of clients and the plurality of servers. The operational view may be changed responsive to the new node joining the cluster of nodes In some embodiments, each node in the cluster of nodes, responsive to identifying that one or more sessions are to be owned by the new node, may push to the new node session information of existing sessions of each node. In some embodiments, each node in the cluster of nodes may inform the new node that each node has completed pushing session information to the new node.

In some embodiments, the new node may receive a second packet corresponding to an existing session of another node in the cluster of nodes and to forward the packet to the other node for processing. In some embodiments, each node in the cluster of nodes, responsive to the detection, may apply the hash function using a receive side scaling (RSS) key. In some embodiments, the new node may update the session table of the new node with session information received from each node of the cluster of nodes.

In another aspect, this disclosure is directed to a system for identifying by a newly joined node in a cluster of nodes a node to process a packet for a session. A cluster of nodes may be intermediary to a plurality of clients and a plurality of servers. Each node of the cluster of nodes may maintain a session table of a plurality of existing sessions between the plurality of clients and the plurality of servers. A new node may join the cluster of nodes and may receive a packet for a session of the plurality of existing sessions. The new node may create session information using a tuple of the packet and may queue the packet for this session. The new node may send a message with the session information to each next node in an enumerated list of nodes of the cluster of nodes until a next node communicates to the new node a reply identifying that a session corresponding to the session information exists on the next node. Responsive to the reply, the new node may update the session table identifying the next node as the owner of the session and may forward the packet to the next node.

In some embodiments, the new node may queue additional packets for the session in a queue until the next node is identified. In some embodiments, the tuple may include a 4-tuple of a source internet protocol address, source port, destination internet protocol address and a destination port of the packet. In some embodiments, the new node may send the message with the session information comprising the tuple of the packet.

In some embodiments, the enumerated list of next nodes may include a random list of nodes in the cluster of nodes. In some embodiments, the next node may include a first node of the cluster of nodes. The first node may respond to the message from new node with a first reply identifying that the session does not exist on the first node. In some embodiments, the new node may create, responsive to the packet, the session in the session table identifying a target node for the session as invalid.

In some embodiments, the new node may update, responsive to the reply, the session in the session table identifying the next node as a target node for the session. In some embodiments, the new node may forward the packet to the next node. In some embodiments, the new node may forward any queued packets to the next node.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for retaining existing connections in clusters of nodes.

A. Network and Computing Environment

Figure 1A:
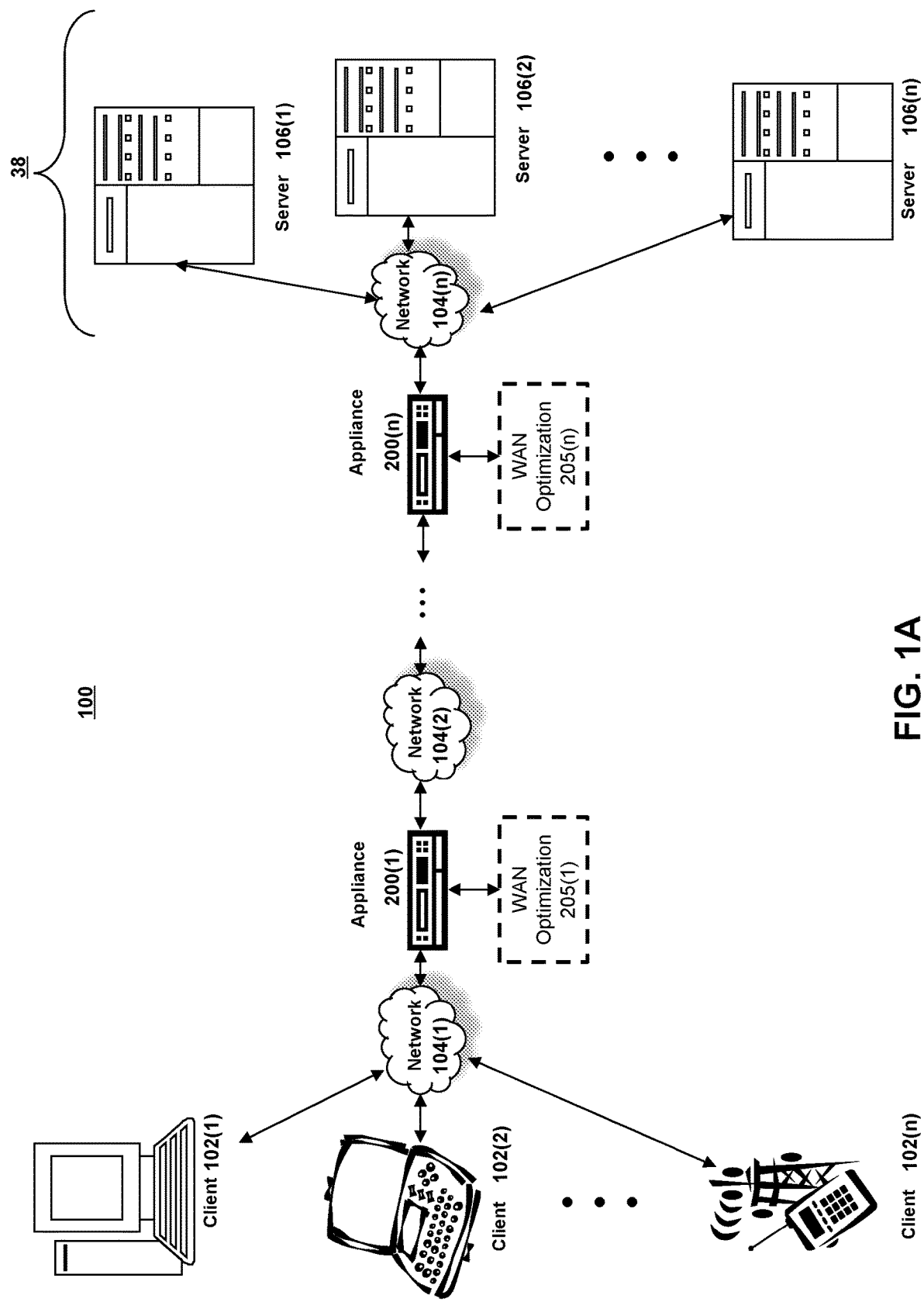
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
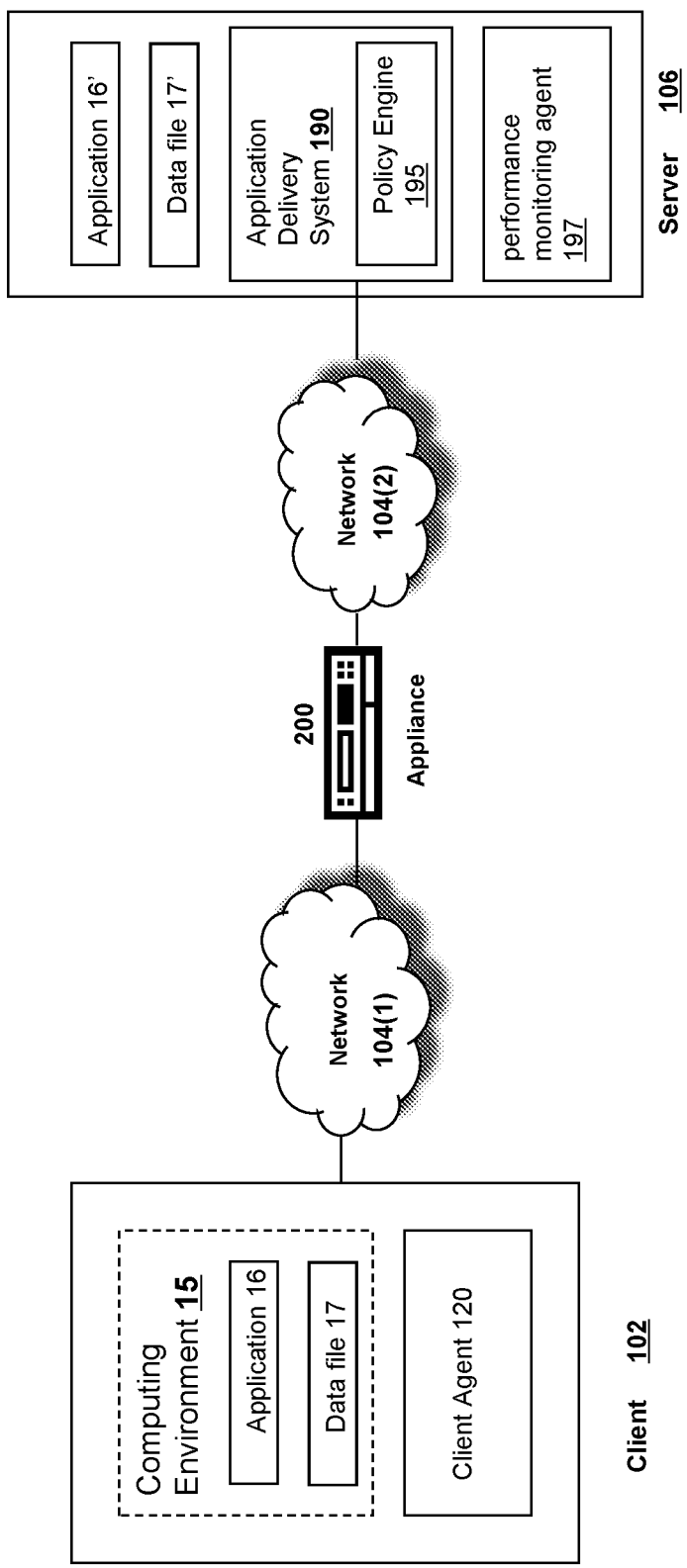
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
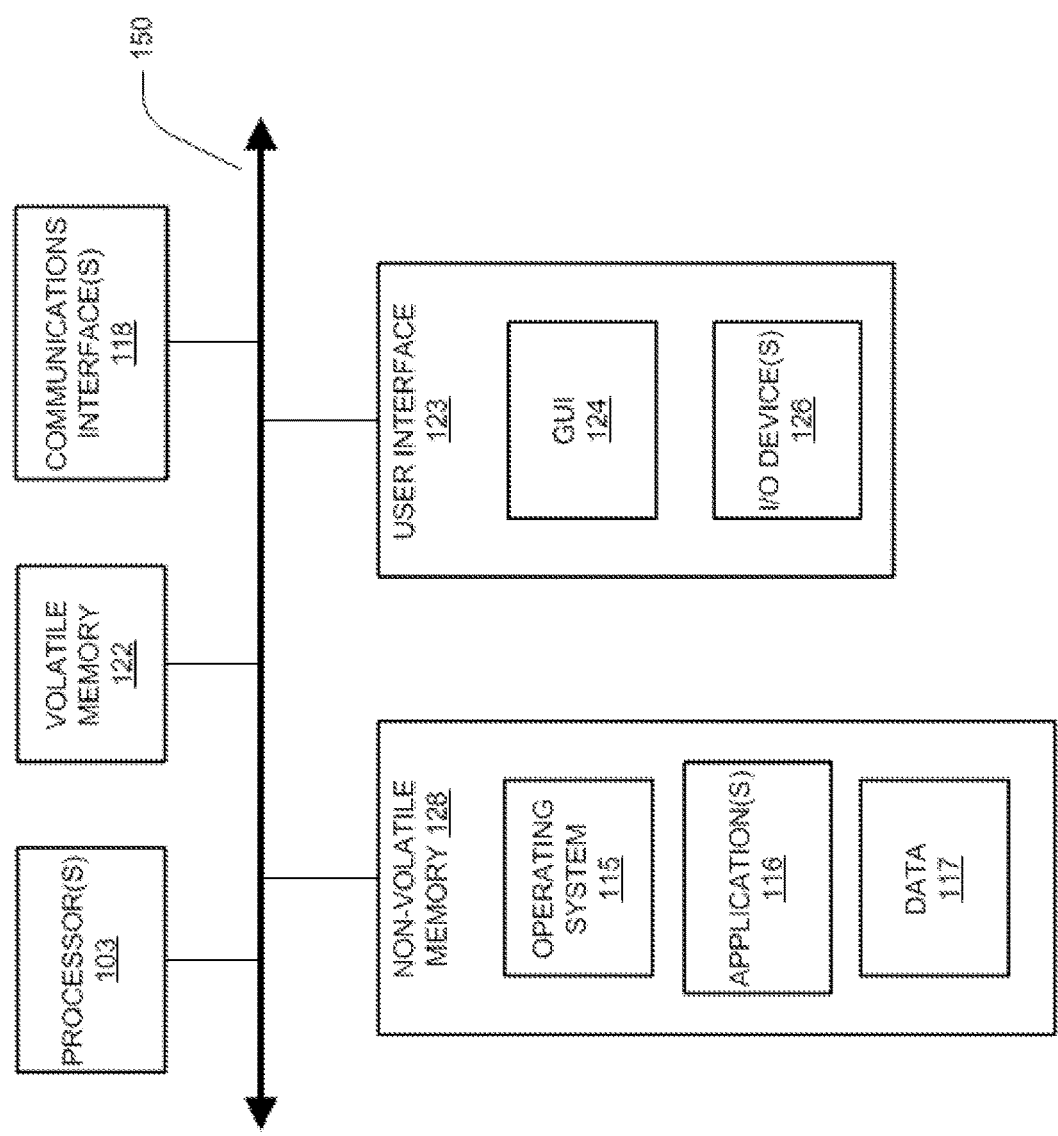
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
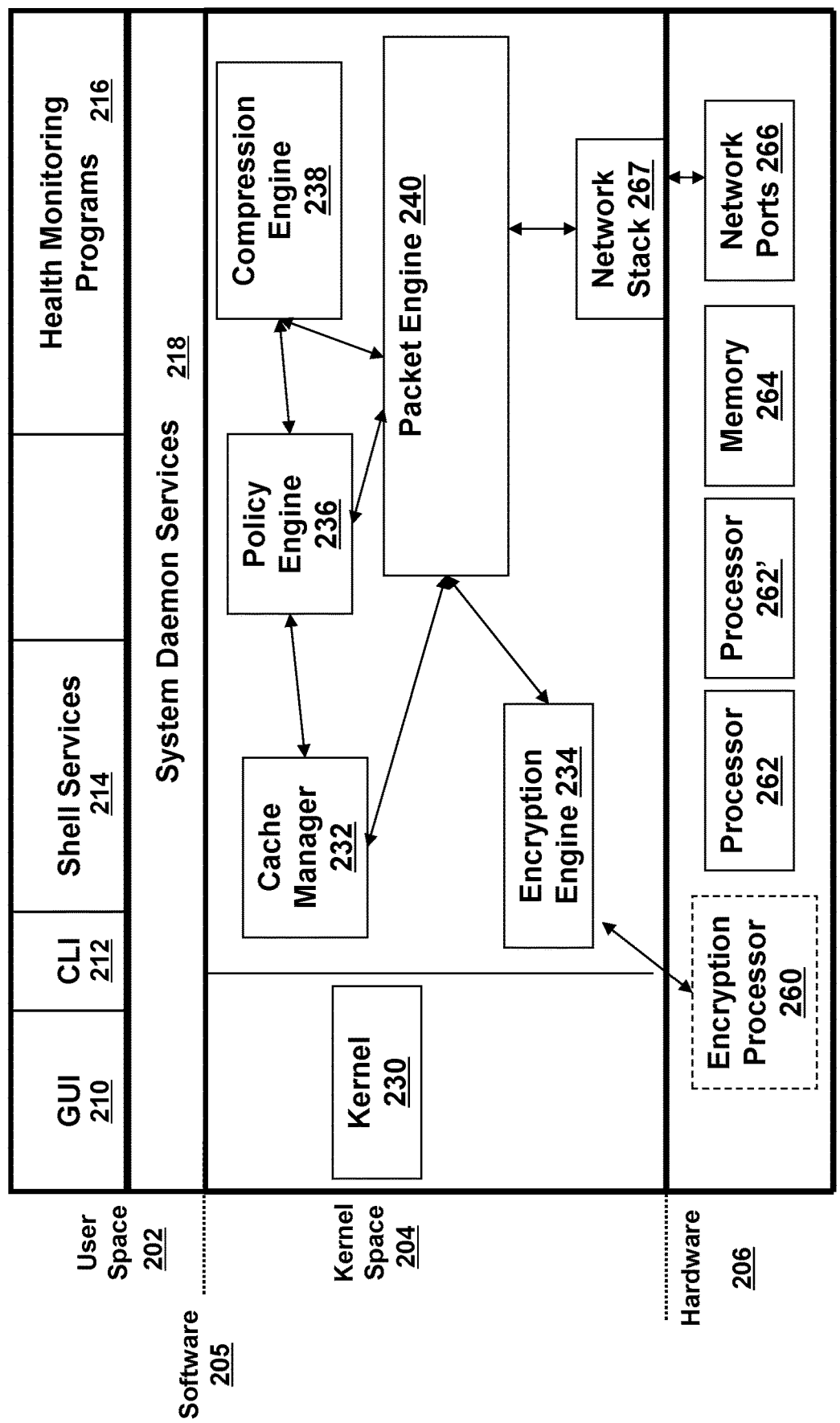
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
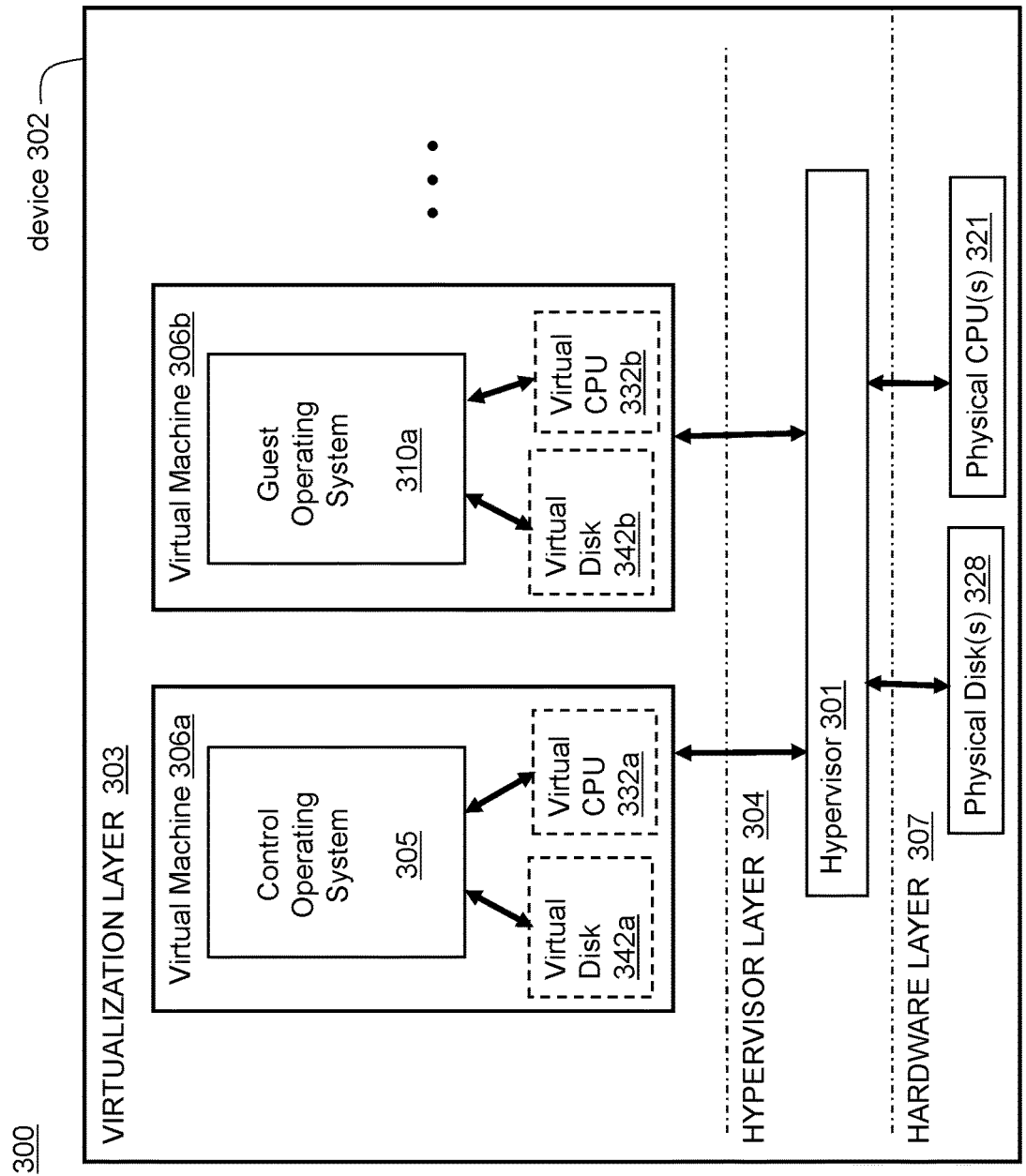
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
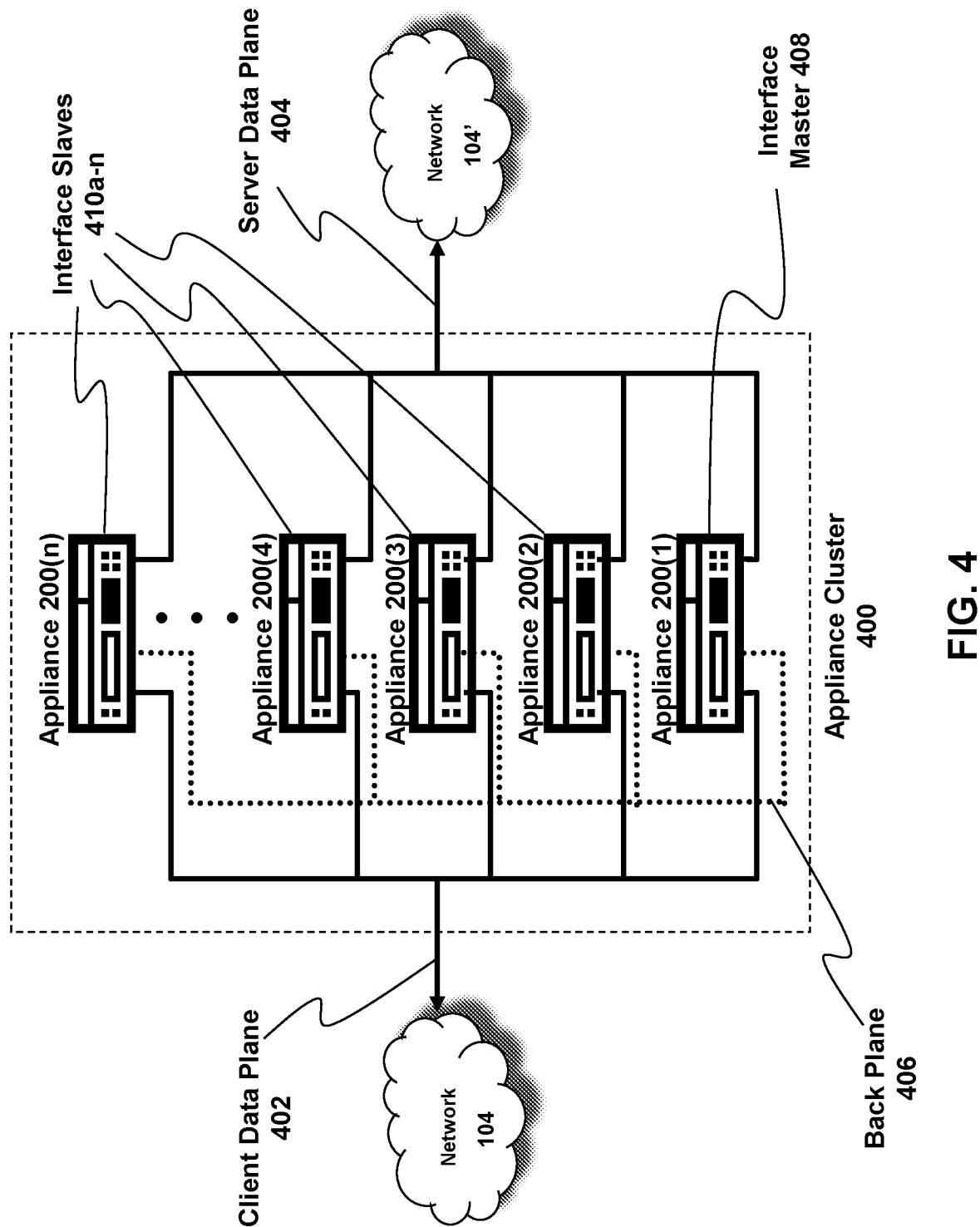
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Retaining Existing Connections in a Cluster of Nodes

The present disclosure is directed toward systems and methods of retaining existing connections in a cluster of nodes. In a cluster system, incoming packets may be distributed across nodes using various routing techniques, such as multi-path routing (e.g., equal-cost-multipath-routing (ECMP)), path addressing (e.g., dynamic source routing (DSR)), and channel bonding (e.g., link aggregation), among others. Each node of the cluster system may keep track of new nodes joining the cluster and nodes leaving the cluster based on heartbeat packets. The nodes of the cluster system may establish a set of active nodes (sometimes referred to as an "operational view") that may serve network traffic. When a packet arrives on a node, the recipient node ("flow receiver") may find the proper node ("flow processor") to process the packet by computing a hash value, using a combination of a two-tuple including a source address and destination address or a four tuple including a source address, source port, destination address, and destination port. The hash value may correspond a session owned by at least one of the nodes in the cluster.

Using the calculated hash value at one node, the packet may be processed at the recipient node or sent to another node. If the hash value corresponds to the recipient node, the recipient node may proceed to processing the packet. On the other hand, if the hash value does not correspond to the recipient node, the recipient node may identify the proper node to forward the packet in accordance to a preference list of nodes. Each packet or session of the packet may be bound to a particular node ("spotted entity"), a subset of active nodes ("partially spotted entity"), or any active node in the cluster system ("striped entity"). The preference list of nodes may include the set of active nodes that may own the packet or session enumerated in accordance to the hash value. The original recipient node may forward the packet to one of the nodes from the preference list. Distributing the packet in this manner may ensure that traffic is uniformly distributed across the nodes of the cluster system.

Issues with maintaining sessions may arise with the joining of new nodes to the cluster or with the leaving of existing nodes from the cluster. When a node fails or otherwise leaves the cluster, a proportional subset of hash values (1/N) for the preference list referencing the leaving node alone may be impacted. When a new node enters or otherwise joins the cluster, the new node may only correspond to a proportional subset of hash values (1/N) for the preference list. In either event, the upstream distribution of traffic may change due to addition or subtraction of new routes or interfaces within the cluster system. Even if the hash values for the sessions were recalculated, the sessions corresponding to the proportional subset of hash values (1/N) for the preference list may be lost. When a node leaves the cluster, the node's share of sessions (1/N of hash values in the preference list) may be lost. When a new node joins the cluster, the node's share of sessions (1/N of hash values in the preference list) may be taken from the existing nodes in the cluster.

Additionally, when new nodes are added to the cluster, packets belonging to sessions to existing nodes may be steered to and arrive at the new node, instead of the existing nodes that own the corresponding sessions. As the new node does not have any session information regarding the existing sessions on the other nodes of the cluster, the newly added node may reset the sessions, resulting in the loss of existing sessions.

To retain sessions across the nodes when a new node joins the cluster, each of the existing nodes in the cluster may detect the newly joining node. Having detected the new node, each existing node may learn about the new node and may include the new node in the operational view. To determine whether any session is to be owned by the new node, each existing node may iterate through the sessions arranged in a session table. For each session maintained in the session table, each existing node may calculate a hash value of a tuple of the session with the source address, source port, destination address, and destination port. Having calculated the hash value for each session, each existing node may identify a subset of hash values corresponding to the newly joined node and may identify a subset of existing sessions mapping to the hash value. The identified subset of existing sessions may be assigned to the newly joined node. Each existing node may then push the session information to the newly joined node. During the push process, if any nodes enter or leave the cluster, the hash values for each session may be recalculated and the updated session information may again be pushed to the new node. Once the push of the session is complete, each existing node may notify the newly joined node. With the session information updated, any packet of one of the sessions assigned to the new node may be directed by the recipient node to the new node.

Subsequently, if the newly joined node receives a packet and does not have session information for the session for the packet, the newly joined node may initiate a hunt operation. The newly joined node may create session information using a tuple of the received packet with a source address, source port, destination address, and destination port. The session information may initially identify a target node as invalid. The newly joined node may also queue the packet and any additional packets for the same session. The newly joined node may identify a next node in the preference list of nodes and may then send a hunt message with the session information to the identified node. Once the hunt message arrives, the recipient node may determine whether the session for the packet exists on the node. If the session for the packet exists on the node, the recipient node may send back a reply to the newly joined node indicating that the session exists on the node. The newly joined node may then update the session in the session table identifying the next node as the target node for the session to steer packets in the session to the target node. In contrast, if the session for the packet does not exist on the node, the recipient node may send back a reply to the newly joined node indicating that the session does not exist on the node. The hunt message may then be forwarded to the next node enumerated in the preference list, and may repeat the process. If there are no more nodes in the preference list, the newly joined node may determine that the target node is invalid and may reset the connection by freeing up the session and dropping the queued packets.

On the other hand, when a node leaves from the cluster (e.g., by being set to passive for maintenance), the node may be immediately removed from the set of active nodes in the preference list, thereby affecting routing or interfaces through the cluster system. As a result, the packets of the session handled previously by the node to be removed may arrive at other nodes. The other nodes may also not steer traffic to the node to be removed. As these other nodes do not have session information regarding the packets of the session, the other nodes may reset the session, also resulting in the loss of existing sessions.

To retain sessions across the other nodes remaining in the cluster, a timeout may be set for to delay the removal of the node from the set of active nodes. During the timeout period, traffic may be steered by the other nodes away from the node to be removed. After the timeout period, the node may be removed from the cluster. The node to be removed may create session information using a tuple of the received packet with a source address, source port, destination address, and destination port. The session information may initially identify a target node as invalid. The node to be removed may also queue the packet and any additional packets for the same session. The node to be removed may identify a next node in the preference list of nodes and may then send a hunt message with the session information to the identified node. Once the hunt message arrives, the recipient node may determine whether the session for the packet exists on the node. If the session for the packet exists on the node, the recipient node may send back a reply to the node to be removed indicating that the session exists on the node. The node to be removed may then update the session in the session table identifying the next node as the target node for the session to steer packets in the session to the target node. In contrast, if the session for the packet does not exist on the node, the node to be removed may determine that the target node is invalid and may reset the connection by freeing up the session and dropping the queued packets.

Figure 5A:
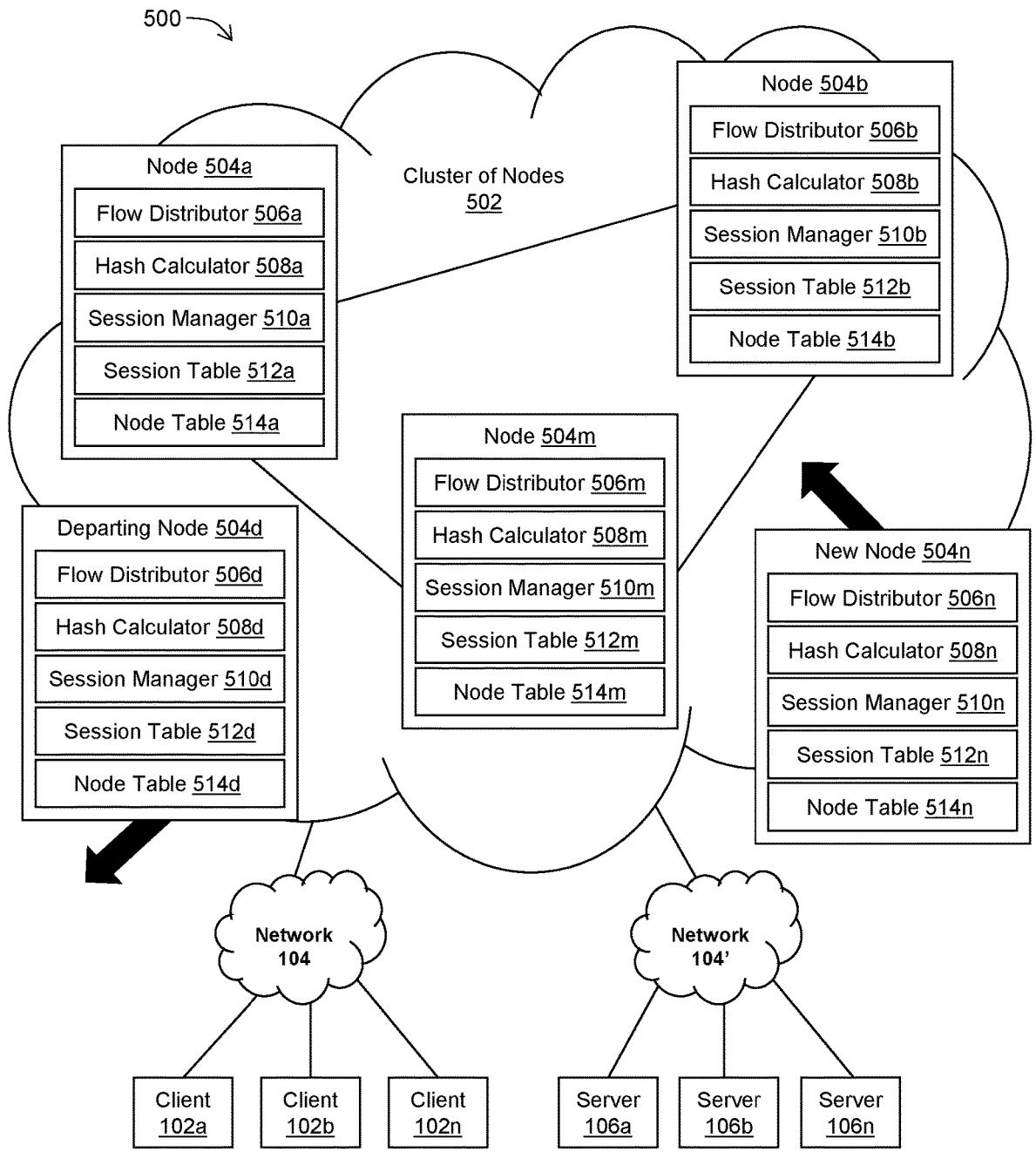
FIG. 5A is a block diagram of a system for retaining existing connections in a cluster of nodes, in accordance with an illustrative embodiment.

Referring now to FIG. 5A, depicted is a block diagram of one embodiment of a system 500 for retaining existing connections in a cluster of nodes. In brief summary, the system 500 may include a plurality of clients 102a-n, a plurality of servers 106a-n, and a cluster of nodes 502, among others. The cluster of nodes 502 may include one or more nodes 504a-m. Each node 504a-m may include a flow distributor 506a-m, a hash calculator 508a-m, a session manager 510a-m, a session table 512a-m, and/or a list of nodes 514a-m, among others. The cluster of nodes 502 may be intermediary to the plurality of clients 102a-n and the plurality of servers 106a-n. The cluster of nodes 502 may be connected to the plurality of clients 102a-n via network 104 and to the plurality of servers 106a-n via network 104'. In some embodiments, a first switch may reside between the plurality of clients 102a-n and the cluster of nodes 502 to route a packet from one of the clients 102a-n to one of the nodes 504a-m. In some embodiments, a second switch may reside between the plurality of servers 106a-n and the cluster of nodes 502 to route a packet from one of the servers 106a-n to one of the nodes 504a-m The cluster of nodes 502 and each node 504a-m therein may comprise features of any embodiment of the devices 200, described above in connection with at least FIGS. 1A-1C, 2, and 4. For example, the cluster of nodes 502 may correspond to the appliance cluster 400 and each node 504a-m therein may correspond to one of the appliances 200(1)-(n) as detailed above in connection with FIG. 4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors in one or more embodiments.

The systems and methods of the present solution may be implemented in any type and form of device, including clients, servers and appliances. As referenced herein, a "server" may sometimes refer to any device in a client-server relationship, e.g., a node 504a-m in a handshake with a client 102a-n. The present systems and methods may be implemented in any intermediary device or gateway, such as any embodiments of the plurality of nodes 504a-m described herein. Some portion of the present systems and methods may be implemented as part of a packet processing engine and/or virtual server of an appliance, for instance. The systems and methods may be implemented in any type and form of environment, including multi-core devices, virtualized environments and/or clustered environments described herein.

In further detail, each node 504a-m of the cluster of nodes 502 may maintain communication sessions between the plurality of clients 102a-n and the plurality of servers 106a-n via the networks 104 and 104'. To this end, the session manager 510a-m at each node 504a-m may maintain the session table 512a-m. The session table 512a-m may include session information for each existing session between the plurality of clients 102a-n and the plurality of servers 106a-n handled at the cluster of nodes 502. The session information for each existing session in the session table 512a-m may include a source address (e.g., an IP address or MAC address), a source port (e.g., a TCP or UDP port number), a destination address (e.g., an IP address or MAC address), and/or a destination port (e.g., a TCP or UDP port number), among others. In some embodiments, the session information of the session table 512a-m may include a session identifier for the session, an account identifier for an entity requesting the session, a client identifier corresponding to one of the clients 102a-n, a client computer type, a server identifier corresponding to one of the servers 106a-n, a server computer type, a communications protocol in use for the session, a security policy to be applied for the session, and/or a time stamp of the session among others.

In distributing network traffic among the cluster of nodes 502, each node 504a-m may establish and maintain a node table 514a-m in the cluster of nodes 502. In some embodiments, the flow distributor 506a-m of each node 504a-m may generate, establish, and/or maintain the node table 514a-m in the cluster of nodes 502. The node table 514a-m may include a node identifier for each node 504a-m in the cluster of nodes 502. The node table 514a-m may also identify each node 504a-m as active or inactive (sometimes referred to as "passive"), using an operability indicator for instance. The node table 514a-m may identify each node 504a-m operating in active or inactive mode. If the operability indicator of a node 504a-m is indicated as active, the node 504a-m may receive, forward, and/or process packets of one or more sessions that are owned by the node 504a-n. On the other hand, if the operability indicator of a node 504a-m is indicated as inactive, the node 504a-n may not receive, forward, and/or process packets of one or more sessions that are owned by the node 504a-n. In some embodiments, a node 504a-n with an operability indicator set to inactive may be under maintenance and may perform a set of maintenance tasks or operations. In some embodiments, a node 504a-n with an operability indicator set to inactive may be leaving or may have left the cluster of nodes 502. In some embodiments, a node 504a-n with an operability indicator set to inactive may otherwise be unconnected from the remainder of the other nodes 504a-m in the cluster of nodes 502.

The node table 514a-m may include an operational view. The operational view may list or otherwise include a set of active nodes that may receive and/or process network traffic between the plurality of clients 102a-n and the plurality of servers 106a-n. In some embodiments, the operability indicator for each node 504a-m of the operational view may be set to active to indicate that the corresponding node 504a-m can receive and process network traffic. In some embodiments, the node table 514a-m may include a set of inactive nodes. The nodes 504a-m in the set of inactive nodes may be under maintenance or may be otherwise be set to passive mode and may not receive or process network traffic. In some embodiments, the operability indicator for each node 504a-m of the set of inactive nodes may be set to passive mode to indicate that the corresponding node 504a-m may not receive and process network traffic.

For each node 504a-m in the operational view, the node table 514a-m may list, specify, or otherwise identify which nodes 504a-m in a processing set are to receive and process packets for each existing session. The processing set may specify an entity type for each existing session between the plurality of clients 102a-n and the plurality of servers 106a-n handled at the cluster of nodes 502. In some embodiments, the processing set may identify or index the entity type for the session by the session identifier of the session table 512a-m. The entity type may specify whether the existing session is bound or owned by a single node 504a-m ("spotted entity"), is bound or owned by a subset of nodes 504a-m in the cluster of nodes 502 ("partially spotted entity"), or is bound or owned by all the nodes 504a-m in the cluster of nodes 502 ("striped entity"). If the entity type of the session is a spotted entity, the processing set may identify a single node 504a-m (e.g., by the corresponding node identifier) for the session. If the entity type of the session is a partially spotted entity, the processing set may identify a subset of nodes 504a-m (e.g., by two or more corresponding node identifiers) in the cluster of nodes 502 for the session. If the entity type of the session is a striped entity, the processing set may include all nodes 504a-m as the operational view and may identify all the active nodes 504a-m in the cluster of nodes 502 for the session.

The flow distributor 506a-m of each node 504a-m may identify which node 504a-m is to receive and process packets for a particular session using the operational view, the processing set, and the hash value (e.g., receive side scaling (RSS) hash key) determined by the hash calculator 508a-m. Upon receipt of a packet for an existing session, the flow distributor 506a-m of the recipient node 504a-m may determine whether the recipient node 504a-m or another node 504a-m is process the packet. The hash calculator 508a-m in turn may identify a tuple of the session for the packet (e.g., a 2-tuple including the source address and the destination address or a 4-tuple including the source address, source port, destination address, and destination port). Using the tuple of the session, the hash calculator 508a-m may calculate a hash value by applying a hash function. The calculation of the hash value is further detailed below. The flow distributor 506a-m may then generate an enumerated list of nodes (sometimes referred to as a "preference list") using the operational view and the processing from the node table 514a-m and the hash value calculated by the hash calculator 508a-m. The enumerated list of nodes may identify one or more nodes 504a-m that are to receive and process the packet for the session. The flow distributor 506a-m may then identify the first node from the enumerated list of nodes, and may determine whether the first node is the recipient node 504a-m or another node 504a-m. If the first node in the enumerated list of nodes is the recipient node 504a-m, the recipient node 504a-m may proceed to process the packet. In contrast, if the identified node is another node 504a-m, the recipient node 504a-m may forward the packet to the other node 504a-m. The distribution of network traffic may change when nodes 504a-m join or leave the cluster of nodes 502 as shall be described below.

When a new node 504n joins the cluster of nodes 502, the flow distributor 506a-m of one or more nodes 504a-m may detect the new node 504n joining the cluster of nodes 502. In some embodiments, the flow distributor 506a-m may detect the new node 504n based on one or more heartbeat packets communicated by the new node 504n. The heartbeat packet from the new node 504n may include a node identifier corresponding to the new node 504n, a packet identifier for the heartbeat packet, and/or a time stamp corresponding to a time of transmission of the packet from the new node 504n, among others. In some embodiments, each node 504a-m and the new node 504n may communicate one or more heartbeat packets to one another node 504a-m and 504n. The heartbeat packet from the node 504a-m already existing in the cluster of nodes 502 may also include a node identifier corresponding to the node 504a-m, a packet identifier for the heartbeat packet, and/or a time stamp corresponding to a time of transmission of the packet from the node 504a-m, among others.

To detect the new node 504n joining the cluster of nodes 502, the flow distributor 506a-m may count a number of heartbeat packets received within a predefined time window. The flow distributor 506a-m may compare the current number of received heartbeat packets with a previous number of received heartbeat packets. If the current number exceeds the previous number, the flow distributor 506a-m may determine that the new node 504n has joined the cluster of nodes 502. In some embodiments, the flow distributor 506a-m may identify any changes in the node identifiers between the current received heartbeat packets and the previously received heartbeat packets. If there are any changes, the flow distributor 506a-m may determine that the new node 504n has joined the cluster of nodes 502.

Upon detecting the joining of the new node 504n, the flow distributor 506a-m may update the node table 514a-m to include the new node 504n. The flow distributor 506a-m may also update the operational view including the set of active nodes. In some embodiments, the flow distributor 506a-m may add, insert, or otherwise append the node identifier corresponding to the new node 504n into the operational view. The flow distributor 506a-m may also set the operability indicator of the node table 514a-m for the new node 504n to active. The flow distributor 506a-m may include the new node 504n in the processing set for sessions with the entity type of partially spotted or striped. In some embodiments, the flow distributor 506a-m of each node 504a-m may transmit or send the updated node table 514a-m to the new node 504n. Upon receipt of the updated node table 514a-m, the new node 504n in turn may store the node table 514a-m locally as a node table 514n.

Furthermore, the hash calculator 508a-m of each node 504a-m may apply a hash function on the session information of each existing session in the session table 512a-m to determine whether any of the sessions are to be owned by the new node 504n. The hash calculator 508a-m may identify the session information of each existing session from the session table 512a-m. Using the session information on the session table 512a-m, the hash calculator 508a-m may identify a tuple of the session for each existing session in the session table 512a-m. The tuple of the session identified by the hash calculator 508a-m may be any combination of the session information included in the session table 512a-m. In some embodiments, the tuple of the session may be a 2-tuple including the source address and the destination address for instance. In some embodiments, the tuple of the session may be a 4-tuple including the source address, the source port, the destination address, and the destination port. In some embodiments, the tuple of the session may be a 5-tuple including the source address, the source port, the destination address, the destination port, and the communications protocol in use for the session. In some embodiments, the tuple of the session may be a 6-tuple including the source address, the source port, the destination address, the destination port, the communications protocol in use for the session, and/or the security policy to be applied to the packets of the session.

Having identified the tuple of the session from the session information of the session table 512a-m, the hash calculator 508a-m may calculate a hash value by applying the hash function on the tuple of the session. The hash function used by the hash calculator 508a-m may include a cyclic redundancy check function, a checksum function, a universal hashing function, a cryptographic hashing function (without or with a key), or any combination thereof, among others. The hash value may be any 8-bit, 16-bit, 32-bit, 64-bit, or 128-bit value computed by the hash function, among others. In some embodiments, the hash calculator 508a-m may apply the hash function to the tuple of the session using a secret key to calculate the hash value. In some embodiments, the hash function applied by the hash calculator 508a-m may include a Toeplitz hash function and the secret key used may include a receive side scaling (RSS) hash key.

With the hash value calculated by the hash calculator 508a-m, the flow distributor 506a-m of each node 504a-m may determine whether any of the existing sessions on the session table 512a-m are to be owned by the new node 504n as a result of the hash value. For each existing session on the session table 512a-m, the flow distributor 506a-m may generate or determine a new enumerated list of nodes using the updated operational view, the updated processing set and the hash value calculated by the hash calculator 508a-m. As the node table 514a-m has changed because of the joining of the new node 504n, the newly generated enumerated list of nodes may change as a result. The new enumerated list of nodes may specify an ordering or arrangement of nodes 504a-m. In each new enumerated list of nodes, the flow distributor 506a-m may determine whether the enumerated list of nodes includes the new node 504n. In some embodiments, the flow distributor 506a-m may compare a node identifier corresponding to the new node 504n with the node identifiers listed in each enumerated list of nodes for the session. If none of the enumerated lists of nodes includes the new node 504n, this may indicate that none of the existing sessions are to be owned by the new node 504n. Subsequently, the flow distributor 506a-m and the session manager 510a-m may wait for a new session to initiate between at least one of the clients 102a-n and the one of the servers 106a-n. Upon detection of the new session, the flow distributor 506a-m and the hash calculator 508a-m may repeat the above detailed process of determining whether any of the sessions are to be owned by the new node 504n.

On the other hand, if at least one of the new enumerated list of nodes includes the new node 504n, this may indicate that a corresponding number of sessions are to be owned by the new node 504n. The session manager 510a-m may also identify one or more sessions that are to be owned by the new node 504n. In some embodiments, the session manager 510a-m may identify session information on the session table 512a-m corresponding to the identified sessions to be owned by the new node 504n. In some embodiments, the session manager 510a-m may identify the session information based on the corresponding session identifiers on the session table 512a-m. With the identification of the one or more sessions that are to be owned by the new node 504n, the session manager 510a-m of each node 504a-m may push the session information of the session table 512a-m to the new node 504n. In some embodiments, the session information pushed by the session manager 510a-m may correspond to the one or more sessions to be owned by the new node 504n. In some embodiments, the session information pushed by the session manager 510a-m may correspond to all sessions between the plurality of clients 102a-n and the plurality of servers 106a-n through the cluster of nodes 502. In some embodiments, the session manager 510a-m of one node 504a-m may inform one another node 504a-m that the node 504a-m has completed pushing the session information to the new node 504n. In some embodiments, the session manager 510a-m of one node 504a-m may also receive a confirmation from all the other nodes 504a-m that the other node 504a-m has completed pushing the session information to the new node 504n. In some embodiments, the session manager 510a-m may determine whether all the other nodes 504a-m have completed pushing the session information based on a number of receipts of confirmation was received. Upon determining that all the other nodes 504a-m have completed pushing the session information, the session manager 510a-m may inform the new node 504n.

The new node 504n in turn may store the session information of the session table 512a-m to update a session table 512n with the session information received from each node 504a-m of the cluster of nodes 502. With the receipt of the session information of the one or more sessions to be owned by the new node 504n, the new node 504n may receive and process one or more packets corresponding to the one or more sessions. The new node 504n may also properly route the packets of the sessions for which the new node 504n has the corresponding session information, thereby retaining existing sessions and preventing loss of connectivity across the cluster of nodes 502. Moreover, the entry of the new node 504n may also increase processing time thereby decrease wait time from additional computation processing capacity added to the cluster of nodes 502.

Upon receiving a packet for the one or more sessions for which the new node 504n has the corresponding session information, the flow distributor 506a-m of the new node 504n may determine whether the new node 504n or another node 504a-m is process the packet. The hash calculator 508n in turn may identify a tuple of the session for the packet (e.g., a 2-tuple including the source address and the destination address or a 4-tuple including the source address, source port, destination address, and destination port). Using the tuple of the session, the hash calculator 508n may calculate a hash value by applying a hash function. The flow distributor 506 v may then generate another enumerated list of nodes using the operational view and the processing from the node table 514n and the hash value calculated by the hash calculator 508 v. The enumerated list of nodes may identify one or more nodes 504a-m or 504n that are to receive and process the packet for the session. The flow distributor 506 v may then identify the first node from the enumerated list of nodes, and may determine whether the first node is the new node 504n or another node 504a-m. If the first node in the enumerated list of nodes is the new node 504n, the new node 504n may proceed to process the packet. In contrast, if the identified node is another node 504a-m, the new node 504n may forward the packet to the other node 504a-m. In this manner, the cluster of nodes 502 may retain and maintain existing sessions across the nodes 504a-m, while moving some of these sessions to the new node 504n.

In contrast, if the new node 504n receives a packet for a session for which the new node 504n does not have corresponding session information, the session manager 510n of the new node 504n may initiate a hunt operation to identify a node 504a-m or 504n to process the packet of the session. The session may be an existing session and the session information for the session may also exist on one of the other nodes 504a-m. The session manager 510n may create session information for the packet using a tuple of the packet. The session manager 510n may queue the packet and any additional subsequent packets for the session. The session information for the session in the session table 512n may include a source address (e.g., an IP address or MAC address), a source port (e.g., a TCP or UDP port number), a destination address (e.g., an IP address or MAC address), and/or a destination port (e.g., a TCP or UDP port number), among others. In some embodiments, the session information may include a session identifier for the session, an account identifier for an entity requesting the session, a client identifier corresponding to one of the clients 102a-n, a client computer type, a server identifier corresponding to one of the servers 106a-n, a server computer type, a communications protocol in use for the session, a security policy to be applied for the session, and/or a time stamp of the session among others. In addition, the session manager 510n may initially set a target node field for the session information to invalid.

In some embodiments, the session manager 510n may identify the tuple of the packet for the session from contents of the packet. In some embodiments, the tuple of the packet may be a 2-tuple including the source address and the destination address for instance. In some embodiments, the tuple of the packet may be a 4-tuple including the source address, the source port, the destination address, and the destination port for instance. In some embodiments, the tuple of the packet may be a 5-tuple including the source address, the source port, the destination address, the destination port, and the communications protocol in use for the session for instance. In some embodiments, the tuple of the packet may be a 6-tuple including the source address, the source port, the destination address, the destination port, the communications protocol in use for the session, and the security policy to be applied to the packets of the session, for instance.

To identify the nodes 504a-m to process the packet, the hash calculator 508n may apply a hash function on the session information of the packet to calculate a hash value. The hash function used by the hash calculator 508n may include a cyclic redundancy check function, a checksum function, a universal hashing function, a cryptographic hashing function (without or with a key), or any combination thereof, among others. The hash value may be any 8-bit, 16-bit, 32-bit, 64-bit, or 128-bit value computed by the hash function, among others. In some embodiments, the hash calculator 508n may apply the hash function to the tuple of the session using a secret key to calculate the hash value. In some embodiments, the hash function applied by the hash calculator 508n may include a Toeplitz hash function and the secret key used may include a receive side scaling (RSS) hash key. With the hash value calculated by the hash calculator 508n, the flow distributor 506n may determine an enumerated list of nodes using the operational view, the processing set, and the hash value. In some embodiments, the flow distributor 506n may use a pseudo-random number generator to determine a random ordering of nodes 504a-m in the cluster of nodes 502 as the enumerated list of nodes. The enumerated list of nodes may specify an ordering of nodes 504a-m to which to send the packet of the session.

In accordance to the order of nodes 504a-m specified in the enumerated list of nodes, the session manager 510n of the new node 504n may send a message with the session information until at least one of the nodes 504a-m indicates that the session information corresponding to the session exists on the recipient node 504a-m. In the interim, as the session manager 510n identifies which node 504a-m has the session information, the session manager 510n may queue any additional subsequent packets for the session. The session manager 510n may identify a first node on the enumerated list of nodes. The session manager 510n may then generate a message including the session information for the packet received by the new node 504n. In some embodiments, the message may include the tuple of the session. The session manager 510n may send the message with the session information to the first node indicated in the enumerated list of nodes.

Upon receipt of the message with the session information, the recipient node 504a-m may determine whether the session corresponding to the session information exists on the recipient node 504a-m. In some embodiments, the session manager 510a-m of the recipient node 504a-m may compare the session information received from the new node 504n with any of the session information on the stored on the session table 512a-m. In some embodiments, the session manager 510a-m may compare the tuple of the session received from the new node 504n with any of the tuples of the session stored on the session table 512a-m. Based on the comparison, the session manager 510a-m may generate a reply. If there is a match between the session information or between the tuples of the session, the session manager 510a-m of the recipient node 504a-m may generate the reply to indicate or identify that the session corresponding to the session information received from the new node 504n exists on the recipient node 504a-m. In some embodiments, the reply may indicate that the recipient node 504a-m is the target node or is a valid target node. If there is no match between the session information or between the tuples of the session, the session manager 510a-m of the recipient node 504a-m may generate the reply to indicate or identify that the session corresponding to the session information received from the new node 504n does not exist on the recipient node 504a-m. In some embodiments, the reply may indicate that the recipient node 504a-m is not the target node or an invalid target node. The session manager 510a-m of the recipient node 504a-m may send the reply back to the new node 504n.

In turn, the session manager 510n of the new node 504n may receive the reply from the node 504a-m that received the session information. From the reply, the session manager 510n may identify an indication of whether the session information corresponding to the session exists on the recipient node 504a-m. If the reply indicates that the session information corresponding to the session does not exist on the recipient node 504a-m, the session manager 510n may determine whether there are any more nodes 504a-m remaining in the enumerated list of nodes. If there are no more nodes 504a-m, the session manager 510n may then reset the connection for the session. In some embodiments, the session manager 510n may remove or delete the one or more packets queued for the session from storage. The session manager 510n may disconnect from the session. If there are more nodes 504a-m remaining on the enumerated list of nodes, the session manager 510n may identify the next node 504a-m listed on the enumerated list of nodes. The session manager 510n may then send another message with the session information to the next identified node 504a-m, and may repeat this functionality until the session manager 510n receives a reply indicated that the session information exists on the recipient node 504a-m or there are no more nodes remaining in the enumerated list of nodes.

In some embodiments, the session manager 510n may maintain a timer to keep track of a time elapsed since the receipt of the initial packet for the session. The session manager 510n may compare the elapsed time to a threshold time (e.g., two minutes). If the elapsed time is less than the threshold time, the session manager 510n may continue to keep track of time. If the elapsed time is less than the threshold time, the session manager 510n may move or delete the one or more packets queued for the session from storage and may reset the connection for the session. In some embodiments, the session manager 510n may send the packets back to the source, such as one of the clients 102a-n or one of the servers 106a-n.

On the other hand, if the reply indicates the session information corresponding to the session exists on the recipient node 504a-m, the session manager 510n may update the session table 514n identifying that the recipient node 504a-m as the owner of the session. The session manager 510n may also set a target node field for the session to valid and may set the target node to the node identifier corresponding to the recipient node 504a-m. The session manager 510n may also forward the one or more packets queued for the session to the recipient node 504a-m. In some embodiments, the one or more packets queued for the session may include packets queued while the session manager 510n is identifying the node 504a-m upon which the session information corresponding to the session exists. The session manager 510n may forward any additional packets received at the new node 504n to the node 504a-m as owning the corresponding session.

When one of the nodes (e.g., node 504d) leaves the cluster of nodes 502, the flow distributor 506d of the departing node 504d may inform all the other nodes 504a-n that the departing node 504 is leaving from the cluster of nodes 502, or is set to maintenance or maintenance node, or is otherwise set to inactive or otherwise passive or passive mode. The flow distributor 506*d* may update the node table 514 to identify the departing node 504*d* as inactive or otherwise passive. The flow distributor 506*d* may also update the set of inactive nodes to include the departing node 504*d*. In some embodiments, the flow distributor 506*d* may add, insert, or otherwise append the node identifier corresponding to the departing node 504*d* into the set of inactive nodes. The flow distributor 506*d* may also set the operability indicator of the node table 514*d* for the departing node 504*d* to passive. The flow distributor 506*d* may also remove the departing node 504*d* in the processing set.

Prior to removing the departing node 504*d*, the flow distributor 506*d* may set a predefined timeout period during which the departing node 504*d* is to continue forwarding and processing one or more packets of the one or more sessions owned by the departing node 504*d*. The predefined timeout period may correspond to an amount of time period to notifying all the other nodes 504*a-n* in the cluster of nodes 502 that the departing node 504*d* is to be set to inactive or passive (or passive mode) or otherwise leave the cluster of nodes 502. In some embodiments, the flow distributor 504*d* may maintain a timer to keep track of a time elapsed since the setting of the departing node 504*d* to inactive or passive (or passive mode). After the elapsing of the predefined timeout period, the flow distributor 506*d* may transmit or send the updated node table 514*d* to each node 504*a-n*. Upon receipt of the updated node table 514*d*, the departing node 504*d* in turn may update the locally stored node table 514*a-n*.

Before the time elapsed exceeds the predefined timeout period, the flow distributor 504*d* may initiate a hunt operation identify another node 504*a-n* to process one or more packets of the session that was to processed by the departing node 504*d*. Upon receipt of a packet for a session owned by the departing node 504*d*, the session manager 510*d* may create session information for the packet using a tuple of the packet. The session manager 510*d* may queue the packet and any additional subsequent packets for the session. The session information for the session in the session table 512*d* may include a source address (e.g., an IP address or MAC address), a source port (e.g., a TCP or UDP port number), a destination address (e.g., an IP address or MAC address), and/or a destination port (e.g., a TCP or UDP port number), among others. In some embodiments, the session information may include a session identifier for the session, an account identifier for an entity requesting the session, a client identifier corresponding to one of the clients 102*a-n*, a client computer type, a server identifier corresponding to one of the servers 106*a-n*, a server computer type, a communications protocol in use for the session, a security policy to be applied for the session, and/or a time stamp of the session among others. In addition, the session manager 510*d* may initially set a target node field for the session information to invalid.

In some embodiments, the session manager 510*d* may identify the tuple of the packet for the session from contents of the packet. In some embodiments, the tuple of the packet may be a 2-tuple including the source address and the destination address. In some embodiments, the tuple of the packet may be a 4-tuple including the source address, the source port, the destination address, and the destination port. In some embodiments, the tuple of the packet may be a 5-tuple including the source address, the source port, the destination address, the destination port, and the communications protocol in use for the session. In some embodiments, the tuple of the packet may be a 6-tuple including the source address, the source port, the destination address, the destination port, the communications protocol in use for the session, and the security policy to be applied to the packets of the session.

To identify another node 504*a-n* to process the packet, the hash calculator 508*d* may apply a hash function on the session information of the packet to calculate a hash value. The hash function used by the hash calculator 508*d* may include a cyclic redundancy check function, a checksum function, a universal hashing function, a cryptographic hashing function (without or with a key), or any combination thereof, among others. The hash value may be any 8-bit, 16-bit, 32-bit, 64-bit, or 128-bit value computed by the hash function, among others. In some embodiments, the hash calculator 508*d* may apply the hash function to the tuple of the session using a secret key to calculate the hash value. In some embodiments, the hash function applied by the hash calculator 508*d* may include a Toeplitz hash function and the secret key used may include a receive side scaling (RSS) hash key. With the hash value calculated by the hash calculator 508*d*, the flow distributor 506*n* may determine an enumerated list of nodes using the operational view, the processing set, and the hash value. In some embodiments, the flow distributor 506*d* may use a pseudo-random number generator to determine a random ordering of nodes 504*a-m* and 504*n* in the cluster of nodes 502 as the enumerated list of nodes. The enumerated list of nodes may specify an ordering of nodes 504*a-m* and 504*n* to which to send the packet of the session.

In accordance to the order of nodes 504*a-n* specified in the enumerated list of nodes, the session manager 510*d* of the departing node 504*d* may send a message with the session information until one of the nodes 504*a-n* indicates that the session information corresponding to the session exists on the recipient node 504*a-n*. In the interim, as the session manager 510*d* identifies which node 504*a-m* has the session information, the session manager 510*d* may queue any additional subsequent packets for the session. The session manager 510*d* may identify the next node on the enumerated list of nodes. The session manager 510*d* may then generate a message including the session information for the packet received by the departing node 504*d*. In some embodiments, the message may include the tuple of the session. The session manager 510*d* may send the message with the session information to the next node indicated in the enumerated list of nodes.

Upon receipt of the message with the session information, the recipient node 504*a-n* may determine whether the session corresponding to the session information exists on the recipient node 504*a-n*. In some embodiments, the session manager 510*a-n* of the recipient node 504*a-n* may compare the session information received from the departing node 504*d* with any of the session information on the stored on the session table 512*a-n*. In some embodiments, the session manager 510*a-n* may compare the tuple of the session received from the departing node 504*d* with any of the tuples of the session stored on the session table 512*a-n*. Based on the comparison, the session manager 510*a-n* may generate a reply. If there is a match between the session information or between the tuples of the session, the session manager 510*a-n* of the recipient node 504*a-n* may generate the reply to indicate or identify that the session corresponding to the session information received from the departing node 504*d* exists on the recipient node 504*a-n*. In some embodiments, the reply may indicate that the recipient node 504*a-n* is the target node or is a valid target node. If there is no match between the session information or between the tuples of the session, the session manager 510*a-n* of the recipient node 504a-n may generate the reply to indicate or identify that the session corresponding to the session information received from the departing node 504d does not exist on the recipient node 504a-n. In some embodiments, the reply may indicate that the recipient node 504a-n is not the target node or an invalid target node. The session manager 510a-n of the recipient node 504a-n may send the reply back to the departing node 504d.

In turn, the session manager 510d of the departing node 504d may receive the reply from the node 504a-m that received the session information. From the reply, the session manager 510d may identify an indication of whether the session information corresponding to the session exists on the recipient node 504a-n. If the reply indicates that the session information corresponding to the session does not exist on the recipient node 504a-n, the session manager 510d may then reset the connection for the session. In some embodiments, the session manager 510d may remove or delete the one or more packets queued for the session from storage. The session manager 510d may disconnect from the session.

On the other hand, if the reply indicates the session information corresponding to the session exists on the recipient node 504a-n, the session manager 510d may update the session table 514d identifying that the recipient node 504a-n as the owner of the session. The session manager 510d may also set a target node field for the session to valid and may set the target node to the node identifier corresponding to the recipient node 504a-n. The session manager 510d may also forward the one or more packets queued for the session to the recipient node 504a-n. In some embodiments, the one or more packets queued for the session may include packets queued while the session manager 510d is identifying the node 504a-n upon which the session information corresponding to the session exists. The session manager 510d may forward any additional packets received at the departing node 504d to the node 504a-n as owning the corresponding session.

Figure 5B:
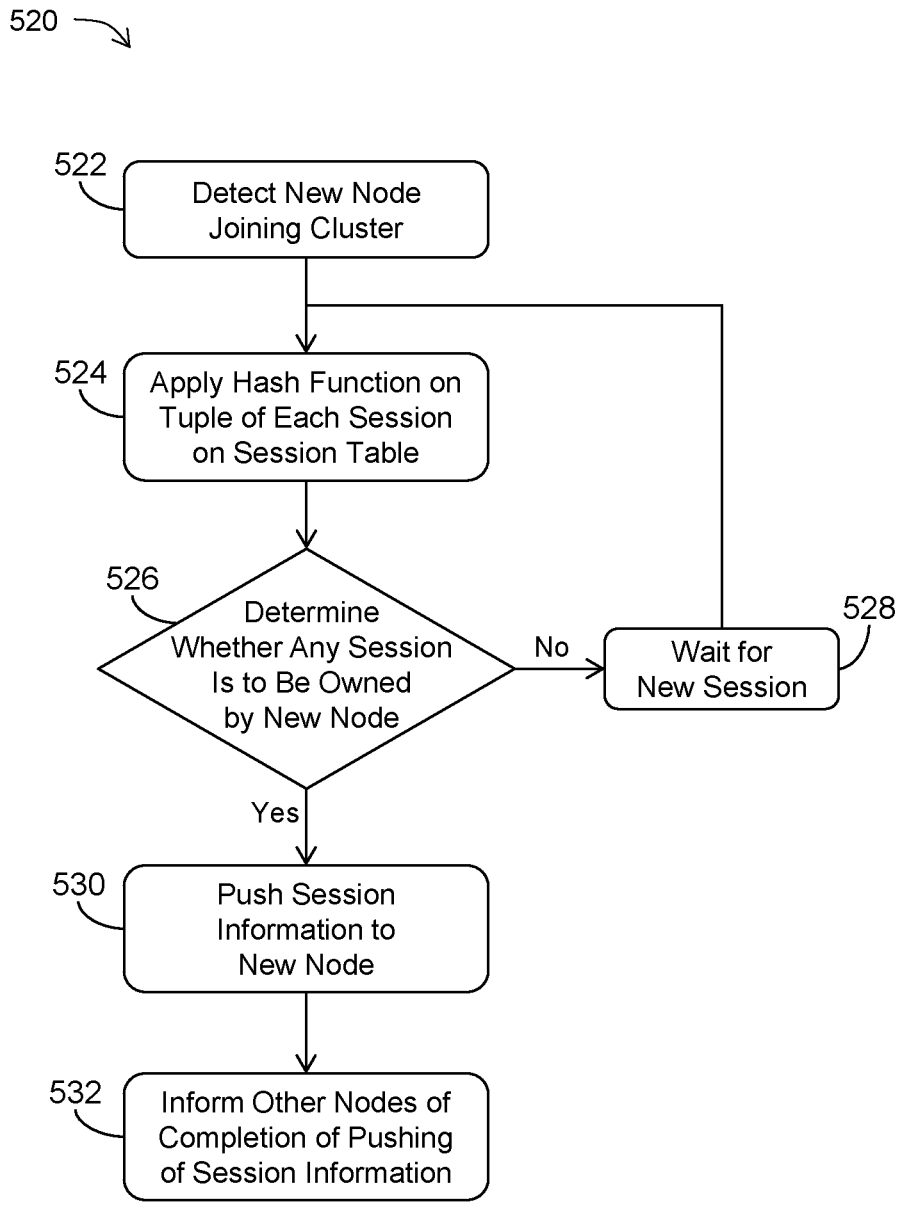
FIG. 5B is a flow diagram of a method of pushing session information to newly joined nodes in a cluster of nodes, in accordance with an illustrative embodiment.

Referring now to FIG. 5B, depicted is a flow diagram of a method 520 of pushing session information to newly joined nodes in a cluster of nodes. The operations and functionalities of the method 520 may be implemented using the system 500 (e.g., existing nodes 504a-m) described above. In brief overview, an existing node may detect a new node joining a cluster (522). The existing node may apply a hash function a tuple of each session on a session table (524). The existing node may determine whether any session is to be owned by the new node (526). If no session is to be owned by the new node, the existing node may wait for a new session (528). If at least one session is to be owned by the new node, the existing node may push session information to the new node (530). The existing node may inform other nodes of completion of pushing of session information (532).

Referring to (522), and in some embodiments, an existing node may detect a new node joining a cluster. When a new node joins the cluster of nodes, the node may detect the new node joining the cluster of nodes. In some embodiments, the node may detect the new node based on a heartbeat packet communicated by the new node. The heartbeat packet from the new node may include a node identifier corresponding to the new node, a packet identifier for the heartbeat packet, and/or a time stamp corresponding to a time of transmission of the packet from the new node, among others.

Referring to (524), and in some embodiments, the existing node may apply a hash function a tuple of each session on a session table. Using the hash function, the existing node may calculate a hash value based on the tuple of the session on the session table. In some embodiments, the tuple of the session may be a 2-tuple including the source address and the destination address. In some embodiments, the tuple of the session may be a 4-tuple including the source address, the source port, the destination address, and the destination port. In some embodiments, a secret hash key for the hash function may be used by the existing node.

Referring to (526), and in some embodiments, the existing node may determine whether any session is to be owned by the new node. For each existing session on the session table, the existing node may determine an enumerated list of nodes (referred to as a "preference list") based on a set of active nodes and the calculated hash values. The enumerated list of nodes may specify an ordering or sequence of nodes that may receive and process packets for the session. In each enumerated list of nodes, the existing node may determine whether the new node exists therein. If the new node is on at least one of the enumerated lists for the sessions, the existing node may determine that the corresponding sessions are to be owned by the new node. If the new node is not on any of the enumerated lists for sessions, the existing node may determine that no corresponding sessions are to be owned by the node.

Referring to (528), and in some embodiments, if no session is to be owned by the new node, the existing node may wait for a new session. The existing node may forward or process the packet without any changes from the joining of the new node into the cluster. Upon detecting a new session across any of the nodes of the cluster, the functionality of steps (522) to (526) may be repeated by the existing node.

Referring to (530), and in some embodiments, if at least one session is to be owned by the new node, the existing node may push session information to the new node. The existing node may identify the session information corresponding to the one or more sessions to be owned by the new node. The existing node may send the session information corresponding to the one or more session to be owned by the new node.

Referring to (532), and in some embodiments, the existing node may inform other nodes of completion of pushing of session information. Upon sending of the session information, the existing node may send an indication of completion to all the other existing nodes in the cluster. With the new node having received the session information, the new node may proceed to receive, forward, and/or process one or more packets of the one or more sessions that are owned by the new node.

Figure 5C:
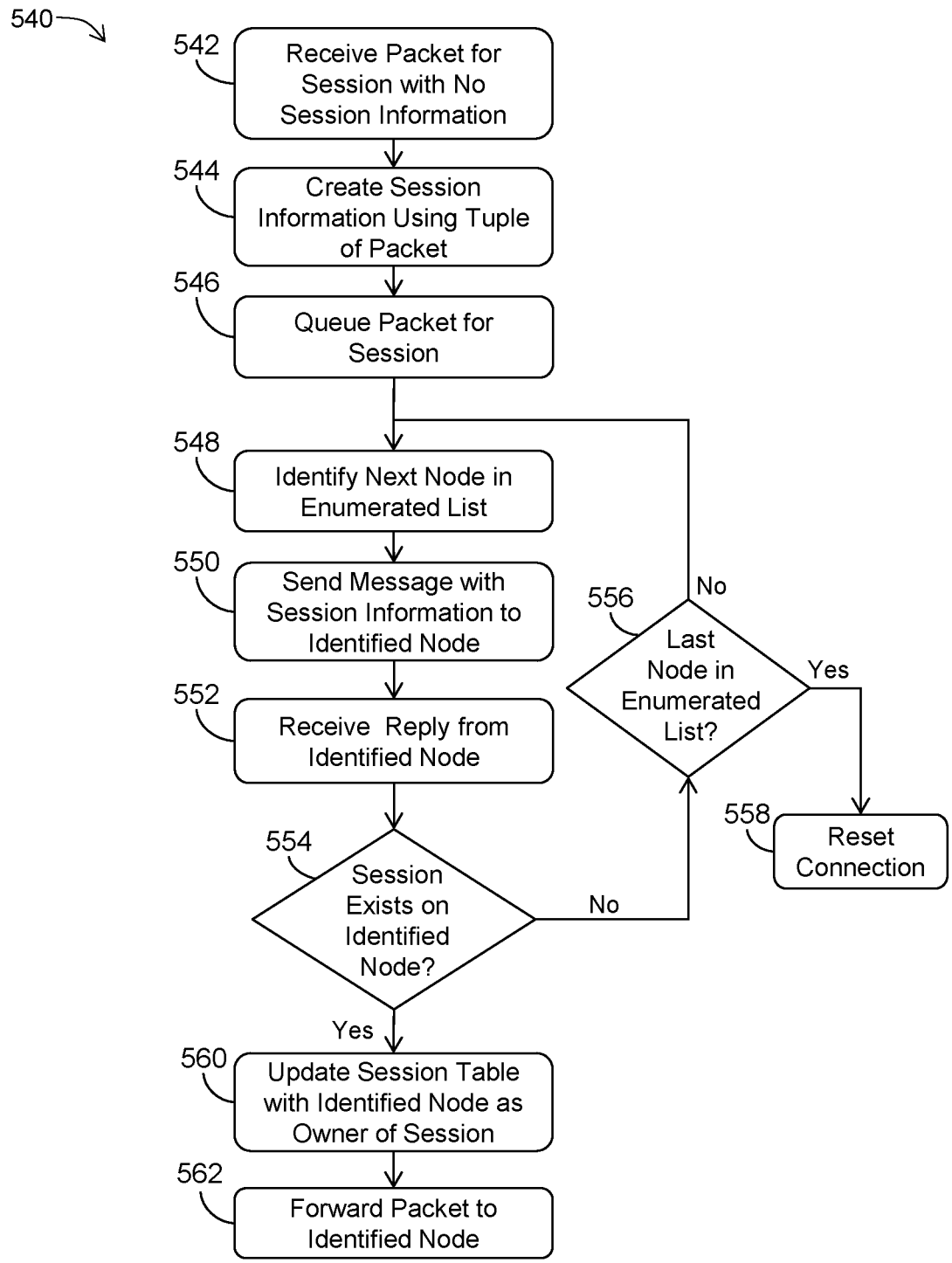
FIG. 5C is a flow diagram of a method of identifying by newly joined nodes in a cluster of nodes a node to process a packet for a session, in accordance with an illustrative embodiment.

Referring now to FIG. 5C, depicted is one embodiment of a flow diagram of a method 540 of identifying by newly joined nodes in a cluster of nodes a node to process a packet for a session. The operations and functionalities of the method 540 may be implemented using the system 500 (e.g., the new node 504n) described above. In brief overview, a new node may receive a packet for a session without any session information (542). The new node may create session information using a tuple of the packet (544). The new node may queue the packet for the session (546). The new node may identify a next node in an enumerated list of nodes (548). The new node may send a message with session information to node identified from the enumerated list of nodes (550). The new node may receive a reply from the identified node (552). The new node may determine whether the session exists on the identified node from the reply (554). If the session does not exist on the identified node, the new node may determine whether the node is the last node in the enumerated list of nodes (556). If the identified node is the last node, the new node may reset the connection (558). If the session exists on the identified node, the new node may update the session table with the identified node as the owner of the session (560). The new node may forward the queue packets to the identified node (562).

Referring to (542), and in some embodiments, a new node may receive a packet for a session without no session information. The packet may be for a session that is owned by one of the other nodes in the cluster of nodes. The new node may initiate a hunt operation to identify which node is to process the packet of the session for which the new node does not have any session information.

Referring to (544), and in some embodiments, the new node may create session information using a tuple of the packet. The new node may parse the packet to identify the tuple of the packet. The tuple of the packet for the session information may include a source address, a source port, a destination address, and/or a destination port, among others. In addition, the new node may initially set a target node field for the session information to invalid.

Referring to (546), and in some embodiments, the new node may queue the packet for the session. The new node may also queue additional, subsequent packets for the session, as the new node proceeds with the hunt operation to identify which node to receive and process the one or more packets for the session.

Referring to (548), and in some embodiments, the new node may identify a next node in an enumerated list of nodes. In some embodiments, to generate the enumerated list of nodes, new node may apply a hash function to the tuple of the packet to compute a hash value. In some embodiments, a secret hash key for the hash function may be used by the existing node. The new node may generate the enumerated list of nodes using the list of active nodes and the hash value calculated using the hash function. In some embodiments, the new node may use a pseudo-random number generate to generate a random ordering of nodes as the enumerated list of nodes. The enumerated list of nodes may specify an ordering of nodes to send the packet of the session to.

Referring to (550), and in some embodiments, the new node may send a message with session information to the node identified from the enumerated list of nodes. The message may include the session information. In some embodiments, the message may include the tuple of the session previously identified by the new node. Upon receipt of the message with the session information, the recipient node may determine whether the session corresponding to the session information exists on the recipient node. The recipient node may then send a reply indicating whether the session corresponding to the session information of the message exists on the node.

Referring to (552), and in some embodiments, the new node may receive a reply from the identified node. The reply may indicate whether the session information of the message sent to the node exists on the recipient node. The reply may also indicate whether the recipient node is a valid target node. Referring to (554), and in some embodiments, the new node may determine whether the session exists on the identified node from the reply.

Referring to (556), and in some embodiments, if the session does not exist on the identified node, the new node may determine whether the node is the last node in the enumerated list of nodes. Referring to (558), and in some embodiments, if the identified node is the last node, the new node may reset the connection. The new node may remove or delete the one or more packets queued for the session from storage. In some embodiments, the new node may maintain a time to keep track of time elapsed since sending of the message. If the time elapsed is greater than a pre-defined threshold, the new node may reset the connection.

Referring to (560), and in some embodiments, if the session exists on the identified node, the new node may update the session table with the identified node as the owner of the session. The new node may also set a target node field for the session to valid and may set the target node to the node identifier corresponding to the node from which the reply originated. Referring to (562), and in some embodiments, the new node may forward the queued packets to the identified node. The new node may also forward any packets that accumulated during the hunt operation to identify a node to which to send the packets.

Figure 5D:
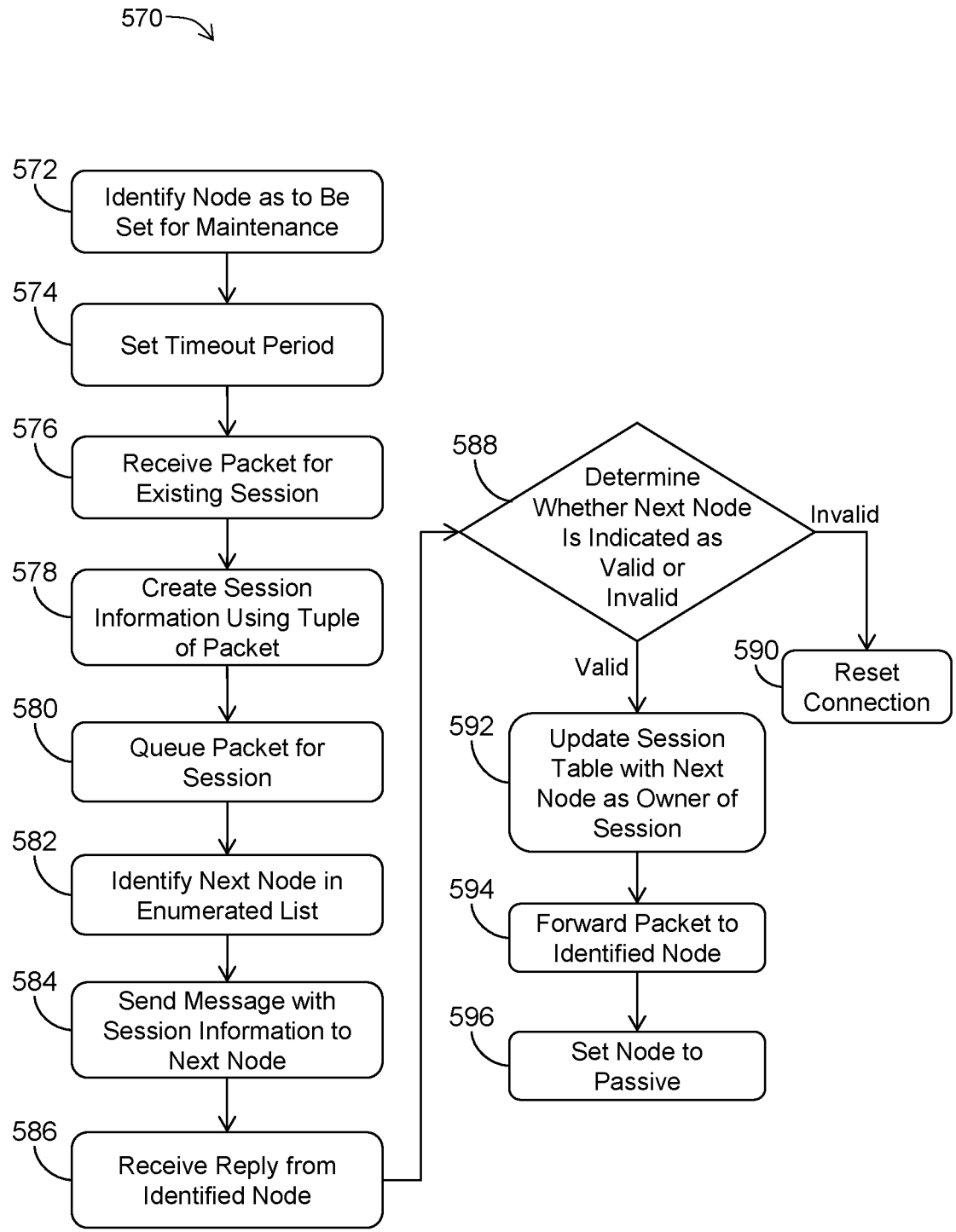
FIG. 5D is a flow diagram of a method of identifying by nodes to be removed in a cluster of nodes a node to process a packet for a session, in accordance with an illustrative embodiment.

Referring now to FIG. 5D, depicted is a flow diagram of a method 570 of identifying by nodes to be removed in a cluster of nodes a node to process a packet for a session. The operations and functionalities of the method 570 may be implemented using the system 500 (e.g., the departing node 504d) described above. In brief overview, a node to be removed may identify the node as to be set for maintenance (572). The node may set a timeout period (574). The node may receive a packet for an existing session (576). The node may create session information using a tuple of the packet (578). The node may queue the packet for the session (580). The node may identify a next node in an enumerated list of nodes (582). The node may send a message with the session information to the next node (584). The node may receive a reply indicating valid or invalid target (586). The node may determine whether the next node is indicated as valid or invalid (588). If invalid, the node may reset the connection (590). If valid, the node may update a session table with the next node as the owner of the session (592). The node may forward the packet to the identified node (594). The node may be set to passive (596).

Referring to (572), and in some embodiments, a node to be removed may identify the node as to be set for maintenance mode. The node may identify itself as otherwise as to be set to passive (or passive mode) or as leaving the cluster of nodes. Referring to (574), and in some embodiments, the node may set a timeout period. The timeout period may correspond to an amount of time period prior to notifying all the other nodes in the cluster of nodes that the node is to be set to passive (or passive mode) or otherwise leave the cluster of nodes.

Referring to (576), and in some embodiments, the node may receive a packet for an existing session. The packet may be for a session that is owned by the node to be removed. The node to be removed may initiate a hunt operation to identify which node is to process the packet of the session for which the new node does not have any session information, prior to the elapsing of the timeout period.

Referring to (578), and in some embodiments, the node may create session information using a tuple of the packet. The node may parse the packet to identify the tuple of the packet. The tuple of the packet for the session information may include a source address, a source port, a destination address, and/or a destination port, among others. In addition, the new node may initially set a target node field for the session information to invalid.

Referring to (580), and in some embodiments, the node may queue the packet for the session. The node may also queue additional, subsequent packets for the session, as the node proceeds with the hunt operation to identify which node to receive and process the one or more packets for the session.

Referring to (582), and in some embodiments, the node may identify a next node in an enumerated list of nodes. In some embodiments, to generate the enumerated list of nodes, node may apply a hash function to the tuple of the packet to compute a hash value. In some embodiments, a secret hash key for the hash function may be used by the existing node. The node may generate the enumerated list of nodes using the list of active nodes and the hash value calculated using the hash function. In some embodiments, the node may use a pseudo-random number generate to generate a random ordering of nodes as the enumerated list of nodes. The enumerated list of nodes may specify an ordering of nodes to send the packet of the session to.

Referring to (584), and in some embodiments, the node may send a message with the session information to the next node. The node may identify the first node in the enumerated list of nodes. The message may include the session information. In some embodiments, the message may include the tuple of the session previously identified by the new node. Upon receipt of the message with the session information, the recipient node may determine whether the session corresponding to the session information exists on the recipient node. The recipient node may then send a reply indicating whether the session corresponding to the session information of the message exists on the node Referring to (586), and in some embodiments, the node may receive a reply indicating a valid or invalid target node. The reply may indicate whether the session information of the message sent to the node exists on the recipient node. The reply may also indicate whether the recipient node is a valid target node. Referring to (588), and in some embodiments, the node may determine whether the next node is indicated as valid or invalid (or a valid or invalid target node). Based on whether the next node is indicated as valid or invalid, the node may determine whether the session exists or does not exist on the next node. If the next node is indicated as valid, the node may determine that the session exists on the next node. If the next node is indicated as invalid, the node may determine that the session does not exist on the next node.

Referring to (590), and in some embodiments, if the session does not exist on the identified node, the node may reset the connection. The node may remove or delete the one or more packets queued for the session from storage. In some embodiments, the node may maintain a time to keep track of time elapsed since sending of the message. If the time elapsed is greater than a predefined threshold, the node may reset the connection.

Referring to (592), and in some embodiments, if the session exists on the identified node, the node may update a session table with the next node as the owner of the session. The node may also set a target node field for the session to valid and may set the target node to the node identifier corresponding to the node from which the reply originated. Referring to (594), and in some embodiments, the node may forward the packet to the identified node. The node may also forward any packets that accumulated during the hunt operation to identify which node to send the packets to. Referring to (596), and in some embodiments, the node may be set to passive. The node may be set to operate in maintenance mode or may otherwise leave the cluster of nodes.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A system comprising:
a cluster of devices;
each device of the cluster of devices comprising one or more processors configured to:
maintain information on a plurality of sessions between one or more clients and one or more servers;
responsive to detecting a second device joining the cluster, apply a function on a tuple of each session of the plurality of sessions to identify which one or more sessions of the plurality of sessions is to be owned by the second device that joined the cluster;
communicate to the second device information on the one or more sessions to be owned by the second device;
process a first packet for a first session owned by a respective device;
receive a second packet of the one or more sessions to be owned by the second device; and
forward the second packet of the one or more sessions received by the respective device to the second device,
wherein at least one device of the cluster of devices is configured to detect that the second device has joined the cluster of devices, and wherein the second device is configured to receive additional packets for a second session and queue the additional packets in a queue until identification of another device of the cluster of devices to own the second session.

2. The system of claim 1, wherein the cluster of devices is intermediary to a plurality of clients and a plurality of servers.

3. The system of claim 1, wherein each device is further configured to maintain information on the plurality of sessions in a table in memory.

4. The system of claim 1, wherein each device is further configured to apply the function comprising a hash function to the tuple of each session.

5. The system of claim 1, wherein the tuple comprises one or more of the following: a source internet protocol (IP) address, a source port, a destination IP address and destination port.

6. The system of claim 1, wherein each of the plurality of sessions between the plurality of clients and the plurality of servers traverses at least one device of the cluster of devices.

7. A non-transitory computer readable storage medium storing instructions that, when executed by one or more processors, cause the one or more processors to:
maintain information on a plurality of sessions between one or more clients and one or more servers;
responsive to detecting a second device joining a cluster of devices, apply a function on a tuple of each session of the plurality of sessions to identify which one or more sessions of the plurality of sessions is to be owned by the second device that joined the cluster;

communicate to the second device information on the one or more sessions to be owned by the second device;

process a first packet for a first session owned by a respective device;

receive a second packet of the one or more sessions to be owned by the second device; and forward the second packet of the one or more sessions received by the respective device to the second device, wherein at least one device of the cluster of devices is configured to detect that the second device has joined the cluster of devices, and wherein the second device is configured to receive additional packets for a second session and queue the additional packets in a queue until identification of another device of the cluster of devices to own the second session.

8. The non-transitory computer readable storage medium of claim 7, wherein the instructions further comprise instructions to communicate the message to each device in order of a list of devices making up the cluster of devices.

9. The non-transitory computer readable storage medium of claim 7, wherein the cluster of devices is intermediary to the one or more clients and the one or more servers.

10. The non-transitory computer readable storage medium of claim 7, wherein the instructions further comprise instructions to update a session table to identify the second device is an owner of the second session.

11. The non-transitory computer readable storage medium of claim 7, wherein the information comprises a tuple of the second packet.

12. The non-transitory computer readable storage medium of claim 11, wherein the tuple comprises one or more of the following: a source internet protocol (IP) address, a source port, a destination IP address and destination port.

13. The non-transitory computer readable storage medium of claim 7, wherein each of the plurality of sessions between the one or more clients and one or more servers traverses the at least one device of the cluster of devices.

14. A method comprising:

maintaining, by at least one device of a cluster of devices on information on a plurality of sessions between one or more clients and one or more servers;

detecting, by the at least one device, that the second device has joined the cluster of devices;

responsive to detecting the second device joining the cluster, applying, by the at least one device, a function on a tuple of each session of the plurality of sessions to identify which one or more sessions of the plurality of sessions is to be owned by the second device that joined the cluster;

communicate, by the at least one device, to the second device information on the one or more sessions to be owned by the second device;

processing, by the at least one device, one or more packets for a session owned by the respective at least one device;

receiving, by the at least one device, a second packet of a second session to be owned by the second device; and forwarding, by the at least one device, the received second packet of the second session to the second device, wherein the second device is configured to receive additional packets for a second session and queue the additional packets in a queue until identification of another device of the cluster of devices to own the second session.

15. The method of claim 14, wherein the cluster of devices is intermediary to a plurality of clients and a plurality of servers.

16. The method of claim 14, further comprising maintaining, by the at least one device, information on the plurality of sessions in a table in memory.

17. The method of claim 14, further comprising applying, by the at least one device, the function comprising a hash function to the tuple of each session.

18. The method of claim 14, wherein the tuple comprises one or more of the following: a source internet protocol (IP) address, a source port, a destination IP address and destination port.

* * * * *